Figure 1:
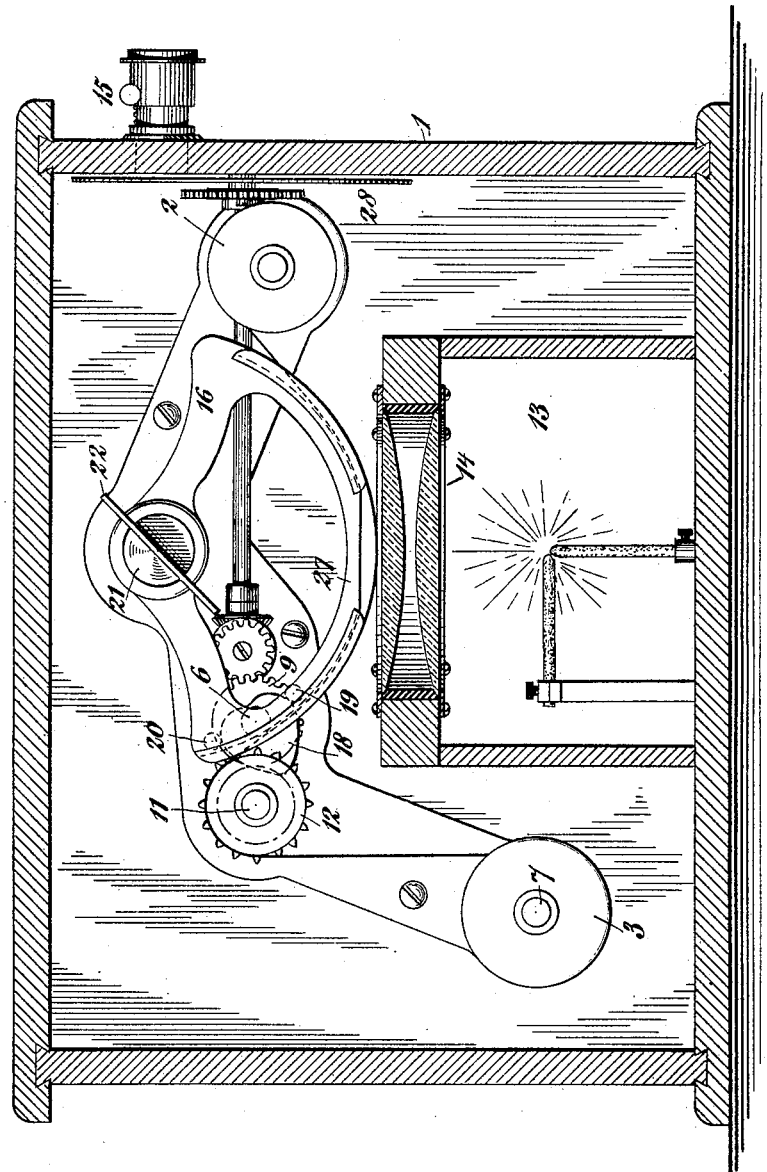

No. 614,366. Patented Nov. 15, 1898.
H. CASLER.
CONSECUTIVE VIEW APPARATUS.
(Application filed Mar. 27, 1897.)

(No Model.) 3 Sheets—Sheet 1.

WITNESSES: INVENTOR
BY
ATTORNEYS

No. 614,366. Patented Nov. 15, 1898.
H. CASLER.
CONSECUTIVE VIEW APPARATUS.
(Application filed Mar. 27, 1897.)
(No Model.) 3 Sheets—Sheet 2.

No. 614,366. Patented Nov. 15, 1898.
H. CASLER.
CONSECUTIVE VIEW APPARATUS.
(Application filed Mar. 27, 1897.)
(No Model.) 3 Sheets—Sheet 3.

WITNESSES: INVENTOR
Herman Casler
BY
ATTORNEYS

UNITED STATES PATENT OFFICE.

HERMAN CASLER, OF CANASTOTA, NEW YORK, ASSIGNOR TO THE AMERICAN MUTOSCOPE COMPANY, OF NEW YORK, N. Y.

CONSECUTIVE-VIEW APPARATUS.

SPECIFICATION forming part of Letters Patent No. 614,366, dated November 15, 1898.

Application filed March 27, 1897. Serial No. 629,522. (No model.)

*To all whom it may concern:*

Be it known that I, HERMAN CASLER, a citizen of the United States, residing at Canastota, in the county of Madison and State of New York, have invented certain new and useful Improvements in Consecutive-View Apparatus; and I do hereby declare the following to be a full, clear, and exact description of the invention, such as will enable others skilled in the art to which it appertains to make and use the same.

My invention relates to consecutive-view apparatus, such as the cameras employed to produce upon a sensitive photographic film a rapid and continuous succession of views of a moving object, and the reproducing instruments or apparatus, projecting or direct view, employed to reproduce to the eye the movements of such objects by means of a succession of views, such as are produced by a consecutive-view camera; and my invention consists in the novel means employed for maintaining the succession of view-carriers optically stationary with reference to the object photographed or with reference to the screen upon which the image is thrown or the eye for brief instants of time without interrupting the continuous and preferably uniform movement of the view-carriers through the feeding mechanism and in the novel combination, construction, and arrangement of the parts of the apparatus.

The objects of my invention are, first, to provide means whereby each view-carrier may be maintained optically stationary in the field of the apparatus for a brief instant of time, so as to permit adequate exposure or illumination thereof without interrupting in any way the continuous and preferably uniform feeding of the view-carriers or film, and, second, to make the mechanism for accomplishing this purpose simple, compact, easily constructed, not liable to derangement, and comparatively inexpensive. These objects are attained in the invention herein described, and illustrated in the drawings which accompany and form a part of this specification, in which the same reference-numerals indicate the same or corresponding parts, and in which—

Figure 2:
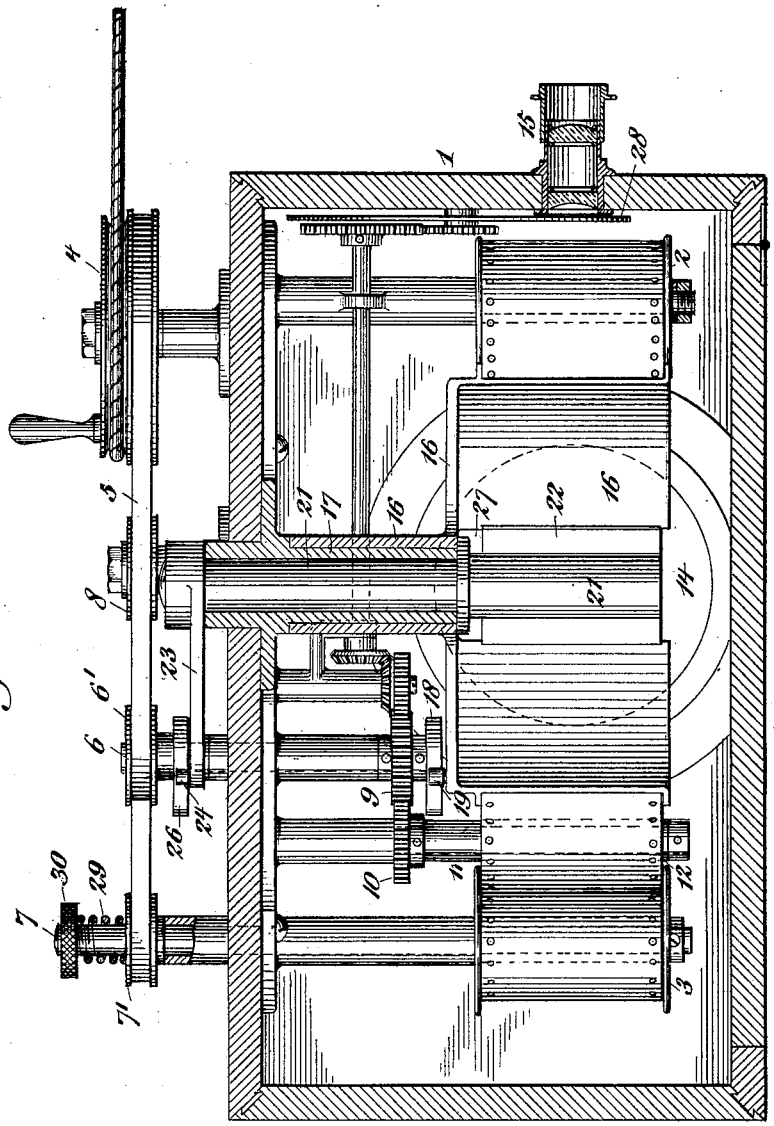
Figure 3:
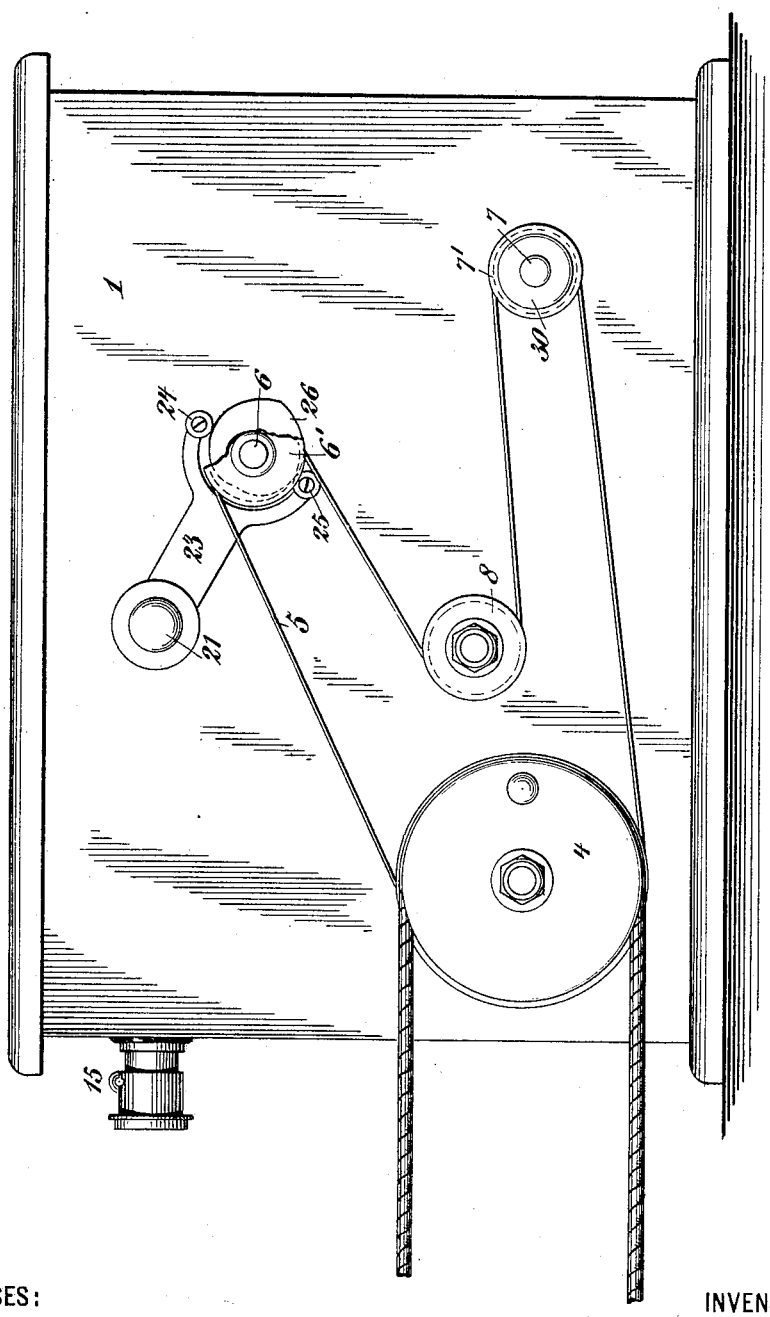

Figure 1 is a side elevation of the mechanism of a consecutive-view-projecting apparatus embodying my invention, the side of the inclosing case having been removed. Fig. 2 is a plan view and partial section of the mechanism, the top of the inclosing case having been removed; and Fig. 3 is an elevation of the side of the instrument opposite to that from which Fig. 1 is taken.

In most consecutive-view apparatus heretofore used the successive views or lengths of film have been moved intermittently through the field of the apparatus, each view or length of film being held stationary in said field for a sufficient interval of time to permit sufficient exposure or illumination, and this intermittent movement of the view or section of film through the field of the apparatus has usually been obtained by checking its movement absolutely and then moving it forward at a greatly-accelerated speed. In the apparatus herein described the film or picture-strip is fed forward continuously and uniformly, and its motion is not interfered with or checked in any way, each view or length of film being held optically, though not actually, stationary in the field of the apparatus for a brief instant by means of a reflector which as the view or film moves follows the movement in such a manner as to keep the view or length of film momentarily in optical relationship with and optically stationary with reference to the lens or observation opening of the apparatus.

In the drawings I have illustrated my invention as applied to a projecting apparatus; but since the invention does not reside in any portion of the mechanism characteristic of a projecting apparatus simply, it is apparent that the invention is equally applicable to a consecutive-view camera or to a direct-vision-reproducing apparatus. The same mechanism, apart from the illuminating apparatus and lenses, may be used in either of these three classes of consecutive-view apparatus.

In the drawings, 1 is the inclosing case of the apparatus.

2 is the roll from which the film is drawn, and 3 is the winding-roll.

4, Figs. 2 and 3, is the driving-pulley. It may be belted to a suitable motor or may be driven in any other manner. From the pulley 4 a belt 5 runs to pulleys 6' and 7' on shafts 6 and 7, the belt passing around an idler 8. This idler is so placed that the belt is in contact with a large portion of the circumference of the pulleys upon the shafts 6 and 7. The shaft 7 carries the winding-spool 3. The shaft 6 has upon its inner end a gear 9, Fig. 2, meshing with a gear 10 upon a shaft 11, which carries the feeding-roll 12. The roll 12 is the main feeding device of the apparatus.

13 is a box or case inclosing the illuminating apparatus of a projecting apparatus.

14 is the condensing-lens, and 15 the objective-lens.

16 is a segmental frame provided on its face with raised edges to guide the film, as shown in Figs. 1 and 2. This segmental frame 16, as shown in Fig. 2, is revolubly mounted upon a boss 17, which is a part of the frame of the apparatus.

Upon the end of the shaft 6 is a cam 18, and upon opposite sides of this cam are friction-rollers 19 and 20, Figs. 1 and 2, carried by the segmental frame 16, and which therefore impart a reciprocating motion to the frame 16 as the cam rotates. The cam is adapted to give a practically uniform circular reciprocating movement to the segmental frame 16, being a heart-shaped cam.

A shaft 21 is journaled in the boss 17 and carries a light-deflector, preferably a reflector or mirror 22. The mirror is directly over the film as it passes under the segmental frame 16. The shaft 21 projects outside of the case 1 and carries an arm 23, having friction-rollers 24 and 25, Figs. 2 and 3, upon opposite sides of a cam 26, similar to cam 18, and mounted upon the same shaft 6 and like said cam adapted to communicate a practically uniform reciprocating motion to the mirror or reflector 22. The cam 26, however, is arranged to move the mirror 22 with but half the speed of movement of the segmental frame 16.

In the face of the segmental frame 16 is a view-aperture 27, of the width and length of a picture upon the film. In passing across this aperture the film is kept taut and straight by the tension upon it.

A suitable shutter 28, driven by shafts and gearing from the cam-shaft 6, may be used, if desired, though I do not limit myself to the use of a shutter.

The operation of the apparatus is as follows: When the driving-wheel 4 is rotated, the feed-drum 12 and the shaft 7, upon which the winding-roll 3 is mounted, are revolved uniformly, and the segmental frame 16 and reflector 22 are likewise reciprocated about their center. The peripheral speed of the frame 16 while it moves with the film is the same as the speed of the film, and therefore the picture remains in registry in the opening 27 while the frame 16 is moving toward the drum 12. The light passing through the view-carrier is reflected by the mirror 22 through the objective-lens upon the screen. The rate of movement of the mirror 22, being half that of the frame 16, is such as to keep the view stationary upon the screen in spite of the movement of the film. When the frame 16 has moved forward to the limit of its travel, it is moved backward by the cam 18 slipping over the film until the opening 27 is in registry with a new picture on the strip. At the same time the mirror 22 is moved backward by the cam 26, so that when the opening 27 is again in registry with a picture the mirror is in a proper position to project this picture through the objective-lens upon the screen.

To allow for the gradual increase in diameter of the winding-roll as the film is wound upon it, the belt-wheel 7', by which the shaft 7 of this roll is driven, is not keyed to the shaft, but is mounted loosely thereon and is held thereto by the frictional connection shown in Fig. 2 and consisting of a spring 29 and a nut 30, which may be screwed up so as to increase the pressure of the spring. This frictional connection permits the belt-wheel to slip somewhat upon the shaft 7 as soon as the film is taut.

I intend the term "reflector" herein used to include not merely a mirror, but also a reflecting-prism, which is recognized as the equivalent of a mirror.

Having thus completely described my invention, what I claim, and desire to secure by Letters Patent, is—

1. In a consecutive-view apparatus, the combination, with a strip-feeding mechanism, a movably-mounted frame provided with a view-aperture, past which said strip may pass, and means for moving said frame in the same direction and at the same speed as said strip, of a movably-mounted reflector so mounted and adapted to be so moved as to hold each length of strip in registry with said view-opening in optical relationship with and optically stationary with reference to a fixed point, and means for so moving said reflector, substantially as described.

2. In a consecutive-view apparatus, the combination, with a strip-feeding mechanism, a rotatably-mounted segmental frame over which the strip may pass, having a view-aperture past which said strip passes, and means for vibrating said frame alternately forward in the direction of and with the speed of movement of said strip, and then backward, of a movably-mounted reflector at the center of rotation of said frame, adapted likewise to rotate about said center and arranged to reflect the image on that portion of the strip in registry with the view-aperture at any instant, and means for vibrating said reflector back and forth synchronously with but half the angular speed of rotation of said frame, whereby while said frame is moving with said strip said reflector is caused to retain the portion of the strip in registry with the view-aperture optically stationary with respect to a fixed point, substantially as described.

3. In a consecutive-view apparatus, the combination, with a uniform-speed strip-feeding mechanism adapted to feed a view-carrying strip through the field of the apparatus, a rotatably-mounted segmental frame over which the strip may pass, having a view-aperture past which said strip passes, and a uniform-speed cam for vibrating said frame alternately forward in the direction of movement of the strip, and then backward, of a rotatably-mounted reflector at the center of rotation of said frame, adapted likewise to vibrate about said center, and a uniform-speed cam for vibrating said reflector back and forth synchronously with said frame, and adapted to communicate to said reflector in its forward movement a uniform speed equal to half the angular speed of the segmental frame in its corresponding movement, substantially as described.

4. In a consecutive-view apparatus, the combination, with a supply-roll having thereon a flexible view-carrying strip, a winding-roll, a main strip-feeding device adapted to feed the strip from the supply to the winding roll, and means for driving said winding-roll and for operating said main feeding device so as to move the strip at a uniform speed, of a rotatably-mounted segmental frame over which the strip may pass, having a view-aperture past which said strip passes, a movably-mounted reflector at the center of rotation of said frame, adapted likewise to vibrate about said center, and uniform-motion cams for vibrating said frame and reflector, adapted to vibrate the frame and reflector forward and back, to move the frame forward with a peripheral speed equal to the speed of the strip and to move the reflector forward with an angular speed equal to half the angular speed of the segmental frame, and means for rotating said cams, substantially as described.

In testimony whereof I affix my signature in presence of two witnesses.

HERMAN CASLER.

Witnesses:
FRANCES A. SPERRY,
HARRY M. MARBLE.